US008882233B2

(12) United States Patent
Jimenez

(10) Patent No.: US 8,882,233 B2
(45) Date of Patent: Nov. 11, 2014

(54) INKJET PRINTER WITH CARRIAGE-COUPLED MEDIA DETECTOR

(75) Inventor: Juan Manuel Jimenez, Escondido, CA (US)

(73) Assignee: Eastman Kodak Company, Rochester, NY (US)

( * ) Notice: Subject to any disclaimer, the term of this patent is extended or adjusted under 35 U.S.C. 154(b) by 262 days.

(21) Appl. No.: 13/477,412

(22) Filed: May 22, 2012

(65) Prior Publication Data

US 2013/0314467 A1 Nov. 28, 2013

(51) Int. Cl.

| | |
|---|---|
| ***B41J 29/393*** | (2006.01) |
| ***B41J 11/00*** | (2006.01) |
| *B41J 29/38* | (2006.01) |
| *B41J 2/01* | (2006.01) |
| *B41J 2/315* | (2006.01) |
| *B41M 5/00* | (2006.01) |
| *G01D 15/10* | (2006.01) |

(52) U.S. Cl.
CPC .................................... *B41J 11/009* (2013.01)
USPC ............... 347/19; 347/16; 347/101; 347/105; 347/187; 347/221

(58) Field of Classification Search
CPC ...... B41J 11/003; B41J 11/009; B41J 11/485; G01N 21/00; G01N 21/86; G01N 21/89; G01N 33/34; G01N 33/346; B41C 1/1041; B41M 5/52; B41M 5/5218; B41M 5/5254
USPC ...................... 347/16, 19, 101, 105, 187, 221
See application file for complete search history.

(56) References Cited

U.S. PATENT DOCUMENTS

| | | | | |
|---|---|---|---|---|
| 4,947,274 | A * | 8/1990 | Casey et al. | 360/256.2 |
| 6,908,243 | B1 * | 6/2005 | Lai | 400/621 |
| 7,120,272 | B2 | 10/2006 | Guiguizian | |
| 7,121,750 | B2 * | 10/2006 | Iwase et al. | 400/354 |
| 7,350,902 | B2 | 4/2008 | Dietl et al. | |
| 8,033,628 | B2 | 10/2011 | Shi et al. | |
| 8,118,390 | B2 | 2/2012 | Pawlik | |
| 8,137,017 | B2 * | 3/2012 | Beardsley | 400/621 |
| 8,251,478 | B2 * | 8/2012 | Shi et al. | 347/16 |
| 2007/0153073 | A1 * | 7/2007 | Kucaba et al. | 347/101 |
| 2011/0096117 | A1 * | 4/2011 | Burke et al. | 347/16 |
| 2011/0096118 | A1 | 4/2011 | Burke et al. | |

* cited by examiner

*Primary Examiner* — Laura Martin
*Assistant Examiner* — Jeremy Bishop
(74) *Attorney, Agent, or Firm* — Peyton C. Watkins

(57) ABSTRACT

An inkjet printer having a print region, the inkjet printer includes an inkjet printhead; a media advance system for advancing recording medium through the printing region; a carriage for moving the printhead back and forth in a carriage scan direction across the print region, the carriage including a first magnetic element; and a platform that is movable along the carriage scan direction, the platform including: an optical sensor for receiving light from the recording medium to determine a type of recording medium; and a second magnetic element for selectively coupling to the first magnetic element.

17 Claims, 16 Drawing Sheets

INKJET PRINTER WITH CARRIAGE-COUPLED MEDIA DETECTOR

CROSS REFERENCE TO RELATED APPLICATION

Reference is made to commonly assigned U.S. patent application Ser. No. 13/477,420, filed concurrently herewith by Juan Jimenez, entitled "Detecting Media Type Using Carriage-Coupled Sensor", the disclosure of which is herein incorporated by reference.

FIELD OF THE INVENTION

The present invention generally relates to digital printing and more particularly to detecting the type of print media being used in the printer.

BACKGROUND OF THE INVENTION

In a carriage printer, such as an inkjet carriage printer, a printhead is mounted in a carriage that is moved back and forth across the region of printing. To print an image on a sheet of paper or other print medium, the medium is advanced a given nominal distance along a media advance direction and then stopped. Media advance is typically done by a roller and the nominal distance is typically monitored indirectly by a rotary encoder. While the medium is stopped and supported on a platen, the printhead carriage is moved in a direction that is substantially perpendicular to the media advance direction as marks are controllably made by marking elements on the medium—for example by ejecting drops from an inkjet printhead. Position of the carriage and the printhead relative to the print medium is precisely monitored directly, typically using a linear encoder. After the carriage has printed a swath of the image while traversing the print medium, the medium is advanced, the carriage direction of motion is reversed, and the image is formed swath by swath.

In order to produce high quality images, it is helpful to provide information to the printer controller electronics regarding the printing side of the recording medium, which can include whether it is a glossy or matte-finish paper. Such information can be used to select a print mode that will provide an optimal amount of ink in an optimal number of printing passes in order to provide a high quality image on the identified media type. It is well-known to provide identifying marks or indicia, such as a bar code, on a non-printing side of the recording medium to distinguish different types of recording media. It is also well known to use a sensor in the printer to scan the indicia and thereby identify the recording medium and provide that information to the printer control electronics. U.S. Pat. No. 7,120,272, for example includes a sensor that makes sequential spatial measurements of a moving media that contains repeated indicia to determine a repeat frequency and repeat distance of the indicia. The repeat distance is then compared against known values to determine the type of media present.

U.S. Pat. No. 8,033,628 discloses the use of a backside media sensor to read a manufacturer's code for identifying media type. In this approach light from a light source is reflected from the backside of the media and received in a photosensor while the print media is being advanced past the photosensor. A source of potential unreliability in interpreting the signals is that media can slip during advance past the photosensor.

U.S. Pat. No. 8,118,390 discloses reflecting light from the backside of the media using an optical path between the carriage and a media input location and sensing the manufacturer's code by a sensor while the media is in the media input location. Such an approach is compatible with media travel paths in which the backside of the media is viewable when the media is in the media input location. However, this is difficult in some other types of media travel paths, especially where the printing side of the media faces outward away from the stack of media.

Co-pending U.S. Patent Application Publication 2011/0096118 discloses an inkjet printer having a paper path where the backside of the print medium is not visible from the carriage throughout the entire media travel path. By using infrared light sources disposed in the platen to transmit light through the print medium, a sensor that is mounted on the carriage can be used to detect the manufacturer's code and identify the media type using transmitted light.

Consequently, a need exists for an apparatus and method for identifying the type of print medium from the manufacturer's code on the backside of the print medium using reflected light for a media travel path and the precisely monitored motion of the carriage for types of media travel paths in which the backside of the print medium is not visible from the carriage throughout the entire media travel path.

SUMMARY OF THE INVENTION

The present invention is directed to overcoming one or more of the problems set forth above. Briefly summarized, according to one aspect of the invention, the invention resides in an inkjet printer having a print region, the inkjet printer comprising an inkjet printhead; a media advance system for advancing recording medium through the printing region; a carriage for moving the printhead back and forth in a carriage scan direction across the print region, the carriage including a first magnetic element; and a platform that is movable along the carriage scan direction, the platform including: an optical sensor for receiving light from the recording medium to determine a type of recording medium; and a second magnetic element for selectively coupling to the first magnetic element.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

Figure 1:
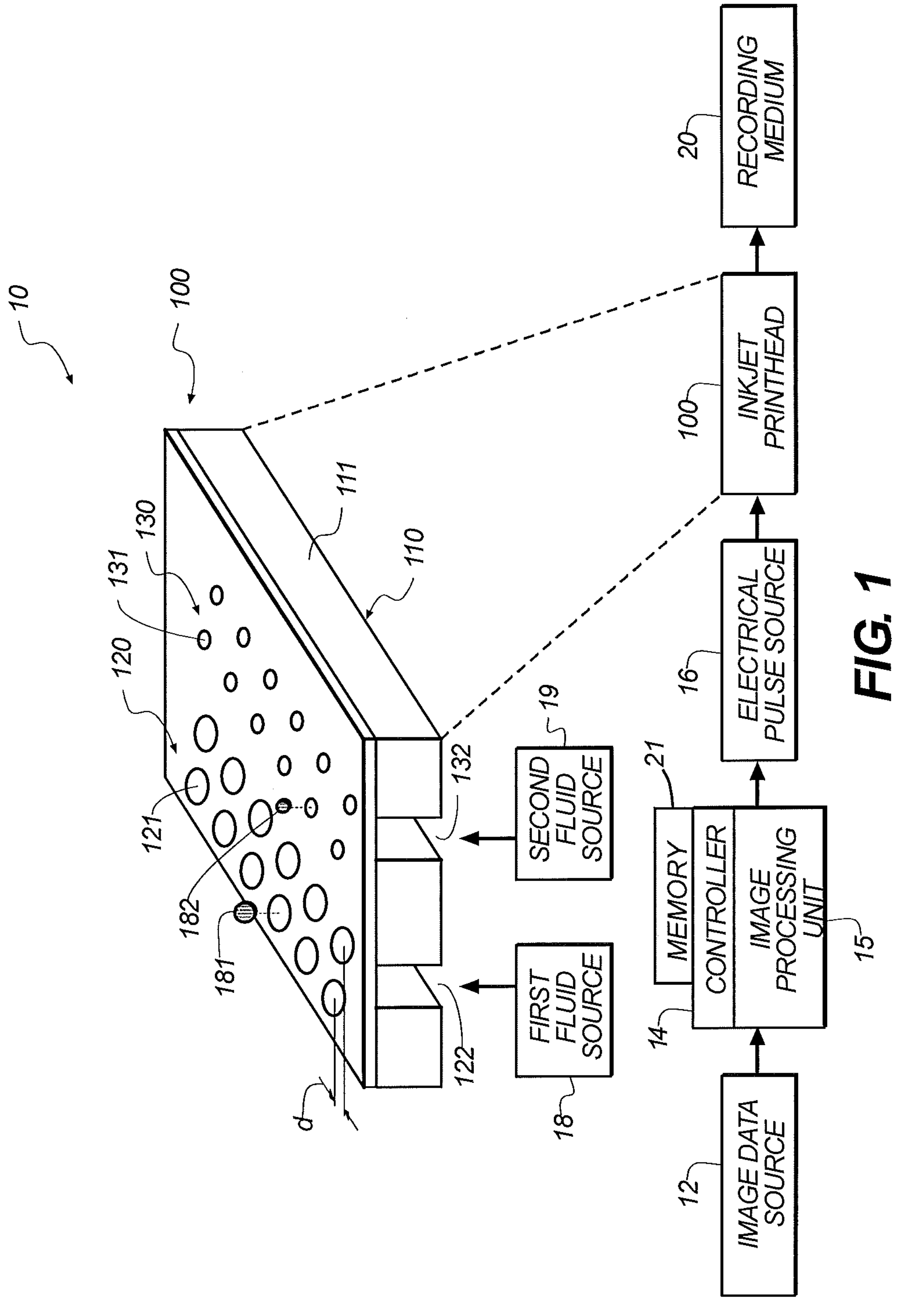
FIG. 1 is a block diagram with an exploded view of an inkjet printhead of the present invention.

Referring to FIG. 1, a schematic representation of an inkjet printer system 10 is shown, for its usefulness with the present invention and is fully described in U.S. Pat. No. 7,350,902, and is incorporated by reference herein in its entirety. An inkjet printer system 10 includes an image data source 12, which provides data signals that are interpreted by a controller 14 as being commands to eject drops. The controller 14 includes an image processing unit 15 for rendering images for printing, and outputs signals to an electrical pulse source 16 of electrical energy pulses that are inputted to an inkjet printhead 100, which includes at least one inkjet printhead die 110. The controller 14 also includes identification processing for comparing an identified type of media to stored media types in a memory 21, as will be discussed in detail hereinbelow.

In the example shown in FIG. 1, there are two nozzle arrays 120 and 130 that are each disposed along a nozzle array direction 254. Nozzles 121 in the first nozzle array 120 have a larger opening area than nozzles 131 in the second nozzle array 130. In this example, each of the two nozzle arrays 120 and 130 has two staggered rows of nozzles 121 and 131, each row having a nozzle density of 600 per inch. The effective nozzle density then in each array is 1200 per inch (i.e. d=1/1200 inch in FIG. 1). If pixels on a recording medium 20 were sequentially numbered along the paper advance direction, the nozzles 121, 131 from one row of the nozzle array 120, 130 would print the odd numbered pixels, while the nozzles 121, 131 from the other row of the nozzle array 120, 130 would print the even numbered pixels.

In fluid communication with each nozzle array is a corresponding ink delivery pathway 122, 132. Ink delivery pathway 122 is in fluid communication with the first nozzle array 120, and ink delivery pathway 132 is in fluid communication with the second nozzle array 130. Portions of the ink delivery pathways 122 and 132 are shown in FIG. 1 as openings through a printhead die substrate 111. One or more of the inkjet printhead die 110 will be included in the inkjet printhead 100, but for greater clarity only one inkjet printhead die 110 is shown in FIG. 1. The printhead die 110 are arranged on a mounting support member as discussed below relative to FIG. 2. In FIG. 1, a first fluid source 18 supplies ink to the first nozzle array 120 via ink the delivery pathway 122, and a second fluid source 19 supplies ink to the second nozzle array 130 via the ink delivery pathway 132. Although distinct fluid sources 18 and 19 are shown, in some applications it can be beneficial to have a single fluid source supplying ink to both the first nozzle array 120 and the second nozzle array 130 via the ink delivery pathways 122 and 132, respectively. Also, in some embodiments, fewer than two or more than two nozzle arrays 120 and 130 can be included on the inkjet printhead die 110. In some embodiments, all nozzles 121 and 131 on the inkjet printhead die 110 can be the same size, rather than having multiple sized nozzles on the inkjet printhead die 110.

The drop forming mechanisms associated with the nozzles 121 and 131 are not shown in FIG. 1. Drop forming mechanisms can be of a variety of types, some of which include a heating element to vaporize a portion of ink and thereby cause ejection of a droplet, or a piezoelectric transducer to constrict the volume of a fluid chamber and thereby cause ejection, or an actuator which is made to move (for example, by heating a bi-layer element) and thereby cause ejection. In any case, electrical pulses from the electrical pulse source 16 are sent to the various drop ejectors according to the desired deposition pattern. In the example of FIG. 1, droplets 181 ejected from the first nozzle array 120 are larger than droplets 182 ejected from the second nozzle array 130, due to the larger nozzle opening area. Typically other aspects of the drop forming mechanisms (not shown) associated respectively with nozzle arrays 120 and 130 are also sized differently in order to optimize the drop ejection process for the different sized drops. During operation, droplets of ink 181 and 182 are deposited on the recording medium 20 (also referred to herein as paper, print medium or medium herein).

Figure 2:
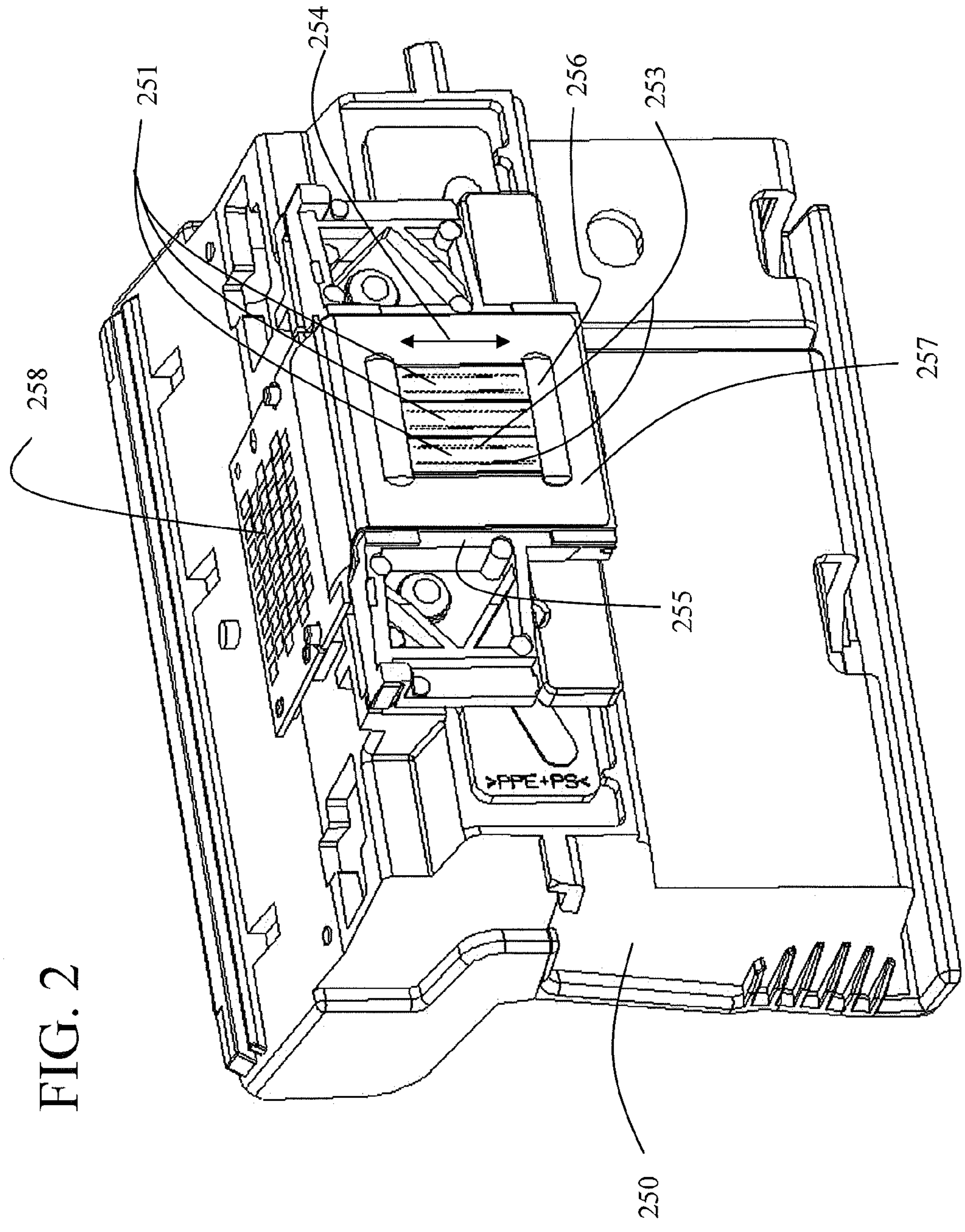
FIG. 2 is a perspective of a printhead of the printer of the present invention.

FIG. 2 shows a perspective view of a portion of a printhead 250, which is an example of the inkjet printhead 100. The printhead 250 includes three printhead die 251 (similar to the inkjet printhead die 110 of FIGS. 1 and 2) that are affixed to a common mounting support member 255. Each of the printhead die 251 contains two nozzle arrays 253 so that the printhead 250 contains six nozzle arrays 253 altogether. In this example, the six nozzle arrays 253 can each be connected to separate ink sources. Each of the six nozzle arrays 253 is disposed along the nozzle array direction 254, and the length of each nozzle array 253 along the nozzle array direction 254 is typically on the order of 1 inch or less. Typical lengths of recording media are 6 inches for photographic prints (4 inches by 6 inches) or 11 inches for paper (8.5 by 11 inches). Thus, in order to print a full image, a number of swaths are successively printed while moving the printhead 250 across the recording medium 20. Following the printing of a swath, the recording medium 20 is advanced along a media advance direction that is substantially parallel to the nozzle array direction 254.

Also shown in FIG. 2 is a flex circuit 257 to which the printhead die 251 are electrically interconnected, for example, by wire bonding or TAB bonding. The interconnections are covered by an encapsulant 256 to protect them. The flex circuit 257 bends around a side of the printhead 250 and connects to a connector board 258. When the printhead 250 is mounted into a carriage 200 (see FIG. 3), the connector board 258 is electrically connected to a connector (not shown) on the carriage 200 so that electrical signals can be transmitted to the printhead die 251.

Figure 3:
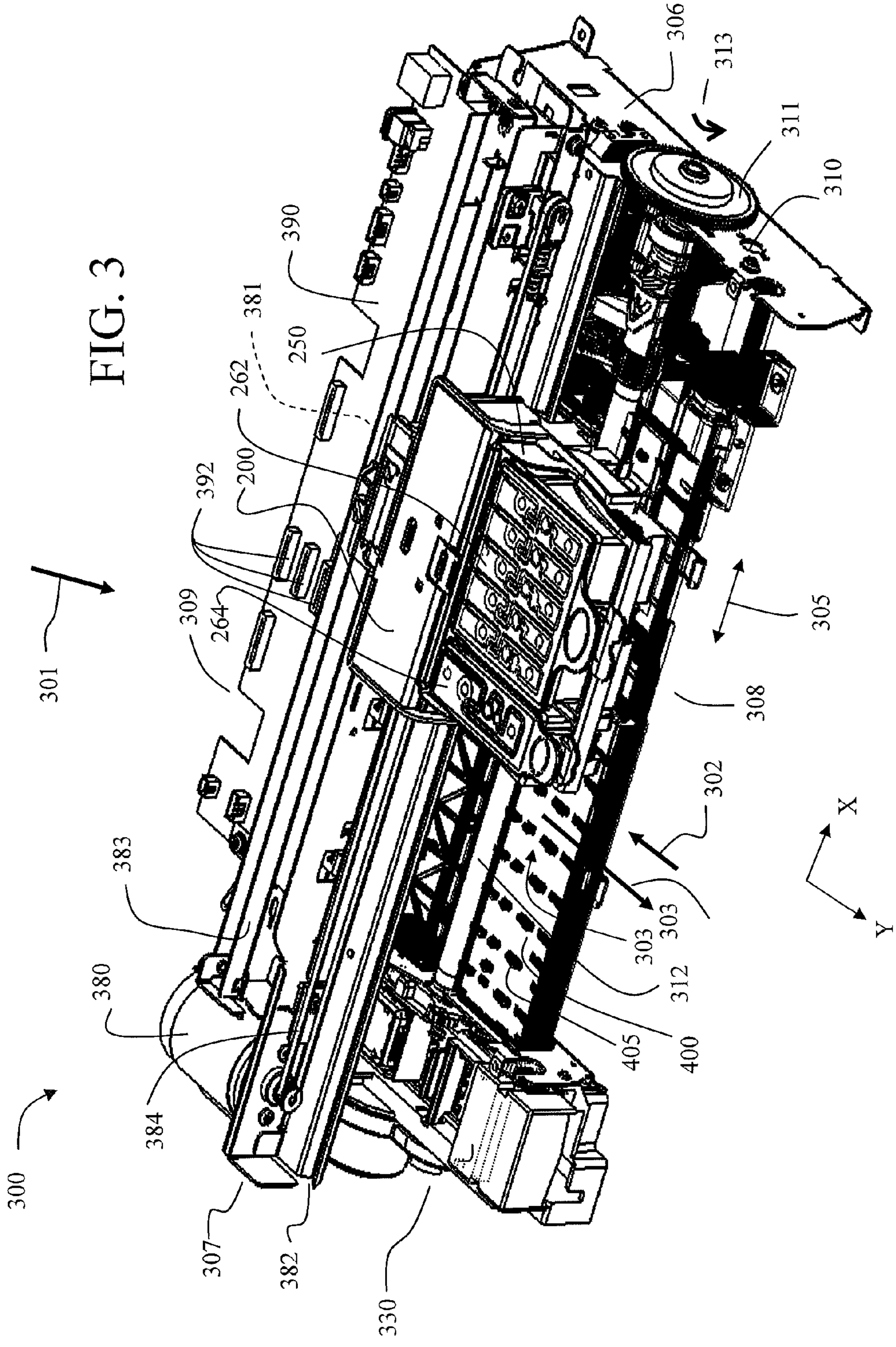
FIG. 3 is a perspective of a portion of an inkjet carriage printer.

FIG. 3 shows a portion of a desktop carriage printer. Some of the parts of the printer have been hidden in the view shown in FIG. 3, such as the magnetically coupled platform described hereinbelow, so that other parts can be more clearly seen. A printer chassis 300 (renumbered as 500 in FIG. 6 when showing the magnetically coupled platform) has a print region 303 across which the carriage 200 is moved back and forth in a carriage scan direction 305 along the X axis, between a right side 306 and a left side 307 of the printer chassis 300 while drops are ejected from the printhead die 251 (not shown in FIG. 3) on the printhead 250 that is mounted on the carriage 200. A carriage motor 380 moves a belt 384 to move the carriage 200 along a carriage guide rail 382. An encoder sensor 381 is mounted on the carriage 200 and indicates carriage location relative to a linear encoder 383 that is disposed along the carriage scan direction 305. In other words, during times when the carriage 200 is moving in the carriage scan direction 305 and the recording medium 20 (see FIG. 1) is not moving, the relative position of the carriage 200 and the recording medium 20 (see FIG. 1) is directly and precisely monitored.

The printhead 250 is mounted on the carriage 200, and a multi-chamber ink supply 262 and a single-chamber ink supply 264 are mounted in the printhead 250. The mounting orientation of the printhead 250 is rotated relative to the view in FIG. 2 so that the printhead die 251 are located at the bottom side of the printhead 250, and the droplets of ink 181 and 182 (see FIG. 1) are ejected downward onto the print medium 20 (se FIG. 1) in the print region 303 in the view of FIG. 3. The multi-chamber ink supply 262, for example, contains five ink sources: a clear protective fluid as well as black, cyan, magenta, and yellow ink; while the single-chamber ink supply 264 contains the ink source for black text. For a C-shaped paper path, paper or other print media is loaded along a paper load entry direction 302 toward a front 308 of printer chassis 300. In a C-shaped paper path, the print media is loaded into a media input location with the backside (i.e. the non-printing side) of the media facing outward, so that sensing of a bar code on the backside using reflected light is straightforward. For the C-shaped paper path, after the print media is advanced from the media input location, the print media is turned over, so that the printing side faces the printhead 250 mounted on the carriage 200. By contrast, in an L-shaped paper (discussed below), the print media is loaded nearly vertically at the rear 309 of the printer chassis 300 along a paper load entry direction 301 with the printing side of the print media facing outward.

The print region 303 is defined as the region along the pathway of the carriage 200 as it moves the printhead 250 in its carriage scan direction 305. In many printers, particularly those that are configured to print borderless prints of photographic images, for example, an absorbent material 400 spans a predetermined length of the printer chassis 300. The absorbent material 400 functions as a collector for absorbing superfluous ink mist or oversprayed ink present in the print region 303. A media support, which can include support ribs or pins 405, protrudes through the absorbent material 400 for providing a surface on which the paper rests during printing. The pins 405 are preferably disposed in a plurality of rows at predetermined locations relative to standard widths of print media so that during borderless printing, ink that is oversprayed beyond the edges of the print medium 20 lands primarily on the absorbent material 400, rather than on the pins 405.

Figure 4:
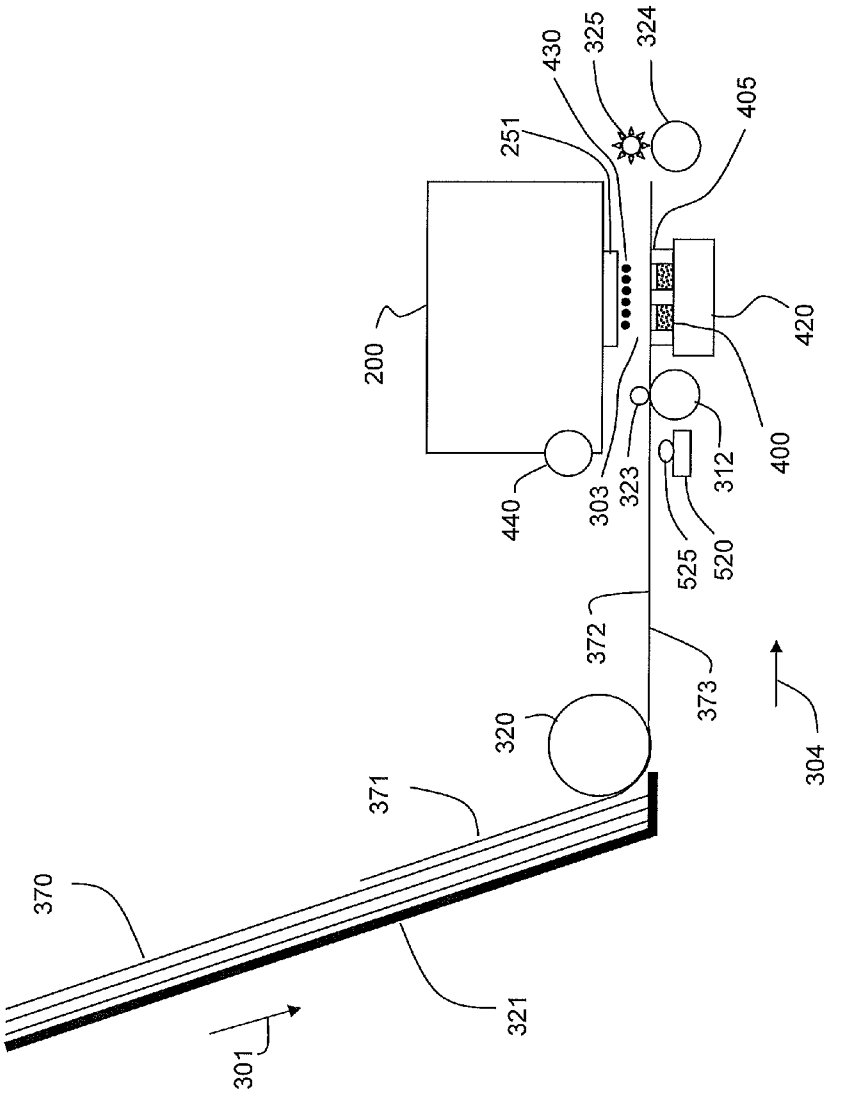
FIG. 4 is a diagram of an embodiment of the present invention, illustrating the flow of the print media through the printing process of the L-shaped paper path.

A variety of rollers are used to advance the print medium 20 (see FIG. 1) through the printer as shown schematically in the side view of the L-shaped paper path of FIG. 4. In this example, a pick-up roller 320 moves a sheet 371 of a stack 370 of paper or other recording medium 20 in a media input support 321 from a paper load entry direction 301 to the direction of the arrow, media advance direction 304. The sheet 371 is then moved by a feed roller 312 and pinch roller(s) 323 to advance along the print region 303, and from there to a discharge roller 324 and star wheel(s) 325 so that printed paper exits along the media advance direction 302. The feed roller 312 includes a feed roller shaft along its axis, and a feed roller gear 311 (see FIG. 3) is mounted on the feed roller shaft. The feed roller 312 can include a separate roller mounted on the feed roller shaft, or can include a thin high friction coating on the feed roller shaft. A rotary encoder (not shown) can be coaxially mounted on the feed roller shaft in order to monitor the angular rotation of the feed roller 312, which indirectly indicates the position of the sheet 371 of media as it is being advanced. The position of the sheet 371 can be estimated from the reading of the rotary encoder, assuming a nominal diameter of the roller, and assuming that the sheet moves without slippage relative to the roller. These assumptions are approximate, but not strictly accurate. Furthermore, while the sheet 371 is being advanced by a pick-up roller 320, before the sheet 371 reaches the feed roller 312, it can be even more susceptible to slippage. For prior art media type identification systems that sense a bar code during the period of time when the sheet 371 is being advanced by the pick roller 320, measured distances between bar code features can sometimes be in error.

The motor that powers the paper advance rollers is not shown in FIG. 3, but a hole 310 at the right side 306 of the printer chassis 300 is where the motor gear (not shown) protrudes through in order to engage the feed roller gear 311, as well as the gear for the discharge roller (not shown). A drive train or belt, for example, can be provided between the feed roller gear 311 and the pick-up roller 320 to drive the pick-up roller 320 when needed. For normal paper pick-up and feeding, it is desired that the feed roller 321 and the discharge roller 324 rotate in forward rotation direction 313. Toward the left side 307 of the printer chassis 300, in the example of FIG. 3, is a maintenance station 330.

Toward the rear 309 of the printer chassis 300, in this example, is located an electronics board 390, which includes cable connectors 392 for communicating via flex cables (not shown) to the printhead carriage 200 and from there to the printhead 250. Also on the electronics board 390 are typically mounted motor controllers for the carriage motor 380 and for the paper advance motor, a processor and/or other control electronics (shown schematically as the controller 14, the memory 21 and the image processing unit 15 in FIG. 1) for controlling the printing process, and an optional connector for a cable to a host computer.

Referring to FIG. 4, a platen 420 forms a foundation in which the absorbent material 400 is disposed. It is noted that the paper path is L-shaped or substantially L-shaped as opposed to a C-shaped paper path. During printing, the carriage 200 traverses back and forth across the printing zone 303 via a carriage guide rod 440 (similar in function to the carriage guide rail 382 shown in FIG. 3) to position the printhead die 251 to eject ink drops 430 for printing onto the printing side 372 (i.e. the side facing the carriage 200) of the sheet 371 at precise locations determined by the image data and the position of the carriage determined from the encoder signals from the linear encoder 383 (see FIG. 3).

Prior to printing on the sheet 371 a manufacturer's code on a nonprinting side 373 (also called the backside) of the sheet 371 can be used to identify the particular type of media being used so that the controller 14 and the image processing unit 15 (FIG. 1) can make any adjustments suitable for that particular media prior to printing. In embodiments of the present invention, an optical sensor 525 is oriented and positioned to receive light reflected from the nonprinting side 373 of the sheet 371. The optical sensor 525 is located on a mount 520 that can be coupled to the carriage 200. Therefore, the position of components affixed to the mount 520 (including the optical sensor 525) relative to the sheet 371 is directly and precisely monitored by use of the encoder sensor 381 and the linear encoder 383 when the mount 520 is coupled to the carriage 200.

Figures 5A, 5B:
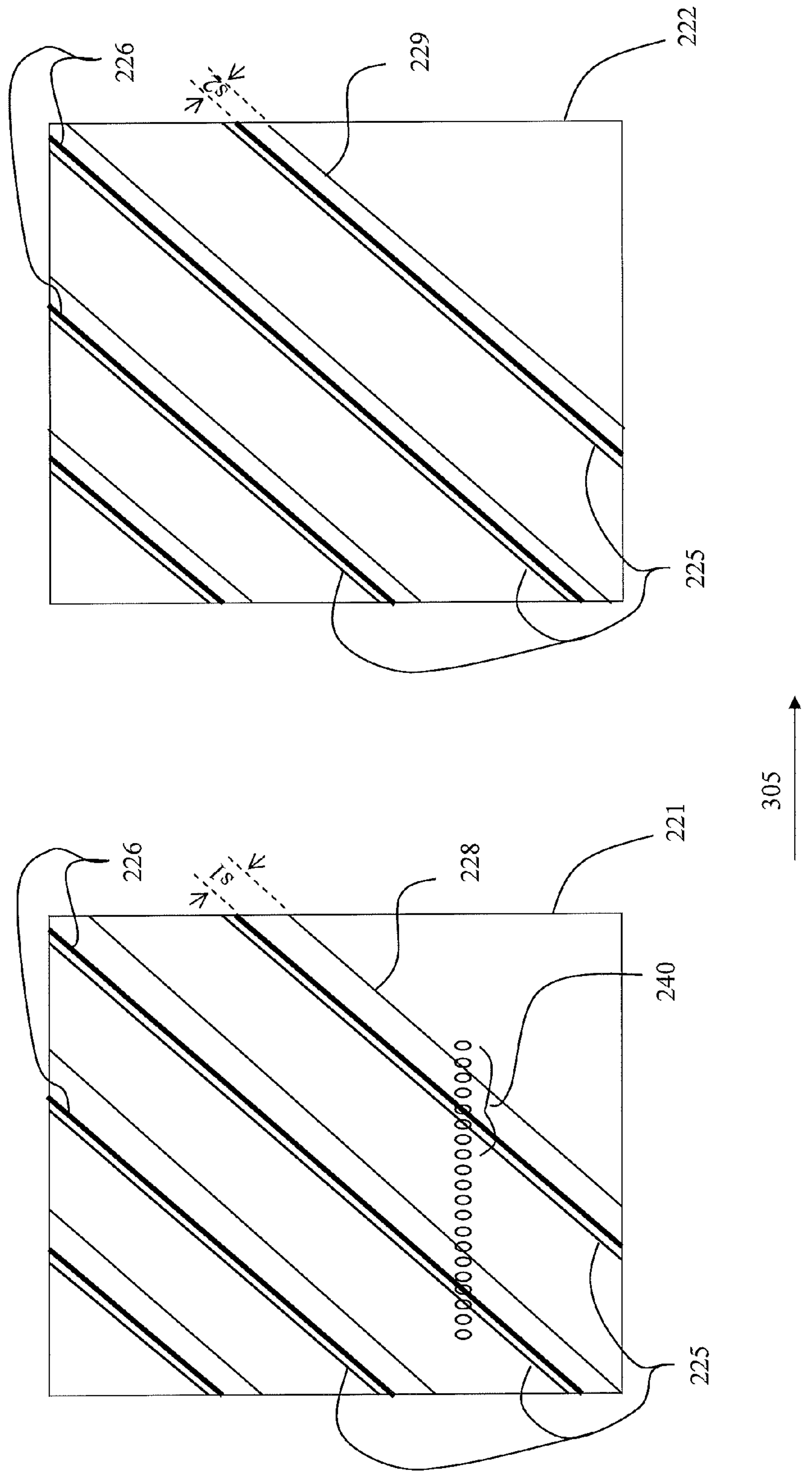
FIGS. 5A and 5B illustrate two different types of print media with correspondingly different bar codes.

FIGS. 5A and 5B show schematic representations of manufacturer's markings on the backside of a first type of recording medium and a second type of recording medium respectively. In this example, each of the various types of recording media has a reference marking consisting of a pair of "anchor bars" 225 and 226 which are located at a fixed distance with respect to one another for all media types. In addition, there is a first identification mark 228 on a first media type 221 in FIG. 5A, and there is a second identification mark 229 on a second media type 222 in FIG. 5B. In this example, the first identification mark 228 is spaced a distance s1 away from the anchor bar 226 on the first media type 221, and the second identification mark 229 is spaced a distance s2 away from the anchor bar 226 on the second media type 229, such that s1 does not equal s2. Thus in this example, it is the spacing of the identification mark from one of the anchor bars 225, 226 that identifies the particular type of recording medium.

Ovals 240 in FIG. 5A schematically represent successive fields of view of the optical sensor 525 (FIG. 4) as the carriage 200 is scanned relative to the media type 221 along the carriage scan direction 305. Because the field of view of the optical sensor 525 moves along the carriage scan direction 305 as the carriage 200 moves, it is actually the projections of marking spacings s1 and s2 along the carriage scan direction 305 that are measured. Light received by the optical sensor 525 is converted into electrical signals, the magnitude of which are related to the amount of light received by the optical sensor 525 at a given time and the spatial position of which is correlated using the precisely monitored position of the carriage 200. Photosensor data is actually sampled much more frequently than the ovals 240 in FIG. 5A show, but only a few samples are shown for clarity. In addition, the actual field of view can be a different size or shape than the ovals 240 shown in FIG. 5A, as determined, for example by an aperture shape of the optical sensor 525 and the angle of the aperture plane relative to the plane of the recording medium.

The output electrical signal of optical sensor 525 can be amplified and filtered to reduce background noise and then digitized in an analog to digital converter. Once the amplified photosensor signal has been digitized, digital signal processing can be used to further enhance the signal relative to high frequency background noise. In addition, the time-varying signals are correlated with spatial distances to find peak widths or distances between peaks corresponding to the code pattern markings. Processed signal data are sent to a processor (for example a processor in controller 14 of FIG. 1) for analyzing processed photosensor signals and comparing them to signal patterns stored in the memory 21 to indicate media type.

In the examples shown in FIGS. 5A and 5B, the bar code markings extend across the recording medium and are repeated a plurality of times on the recording medium. This configuration can be advantageous for the manufacturer of the recording medium in that recording media is typically manufactured in large rolls that are subsequently cut to size. If the bar code extends as in FIGS. 5A and 5B it can be applied while the recording medium is still in the large roll format, and cut to whatever size is required. Smaller bar codes that are positioned with respect to a particular edge or corner of the recording medium are not as easily provided.

It can be appreciated from the field of view ovals of 240 in FIG. 5A, that it is preferable that optical sensor 525 and the mount 520 (FIG. 4) have a range of motion of one to two inches or more along a direction that is substantially parallel to the carriage scan direction 305 while coupled to the carriage 200. It can also be appreciated from FIG. 4 that since the carriage 200 and the mount 520 are located on opposite sides of the paper path for the sheet 371, the coupling of the carriage 200 and the mount 520 must be done in such a way that the paper path is not obstructed.

Figure 6:
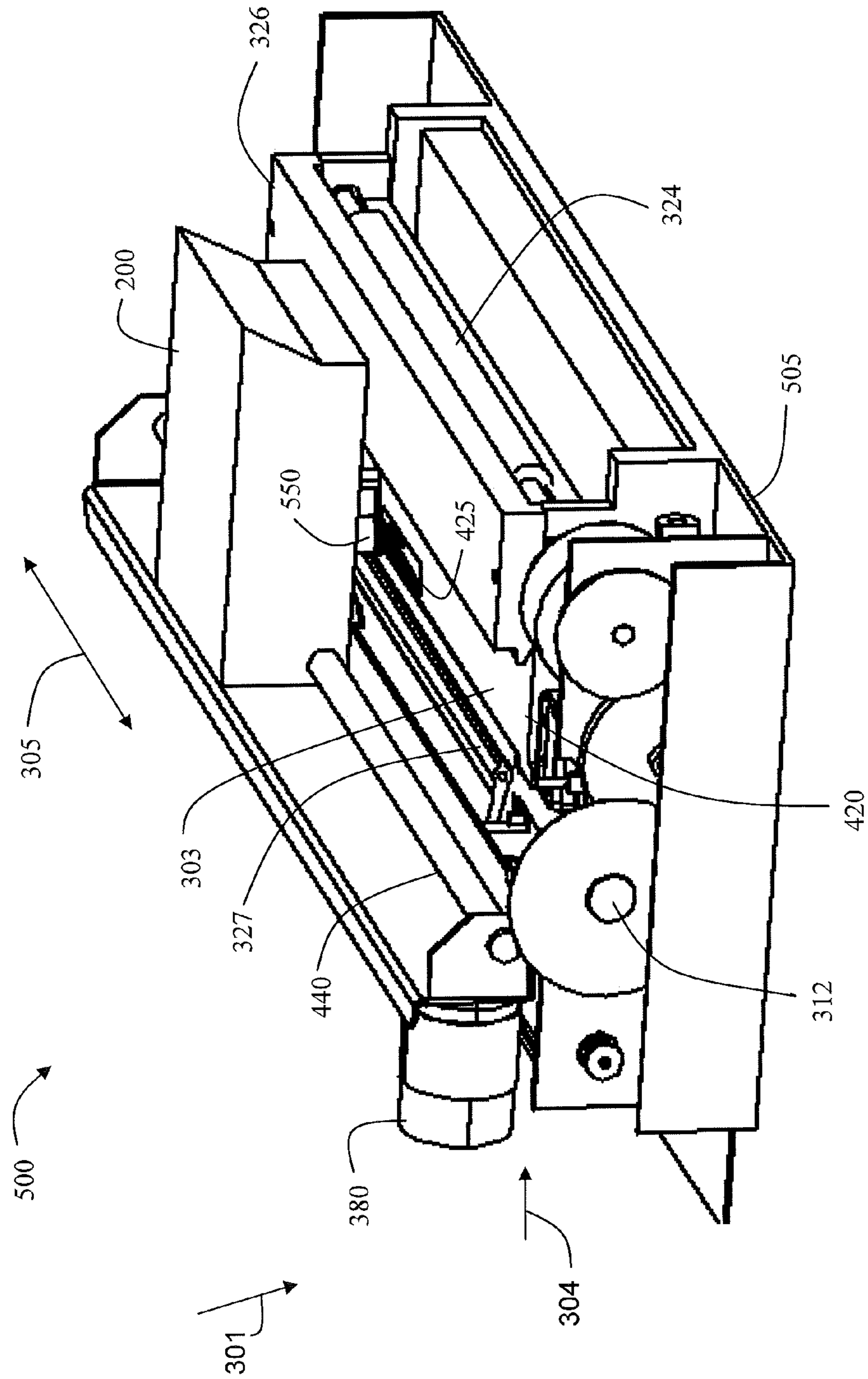
FIG. 6 shows a perspective of a portion of an inkjet carriage printer according to an embodiment of the present invention.

FIG. 6 shows a perspective of a portion of an inkjet carriage printer according to an embodiment of the present invention. The paper path is L-shaped, as in FIG. 4, with paper being loaded along a paper load entry direction 301 and then advanced along the media advance direction 304. Printer chassis 500 includes a base 505 to support the various components. Carriage motor 380 moves the carriage 200 along the carriage guide rod 440 and carriage position is monitored by the linear encoder 383 (FIG. 3). The feed roller 312 moves the sheet 371 (FIG. 4) toward the print region 303 where the paper is supported by platen 420 during printing. The sheet 371 is held against the feed roller 312 by the pinch rollers 323 (FIG. 4) in pinch roller assembly. After printing, the paper is further advanced by the discharge roller 324 so that it can be retrieved by the user. The star wheels 325 (FIG. 4) are housed within a star wheel assembly 326 and hold the paper against the discharge roller 324 as the paper is being advanced from the print region 303. An opening 425 is provided in the platen 420 and extends on the order of 1 to 2 inches along the carriage scan direction 305 to facilitate the temporary coupling of the carriage 200 to an assembly including the mount 520 and the optical sensor 525 (FIG. 4) to move them along the carriage scan direction 305 as described in further detail below. An electromagnet mounted on the underside of the carriage 200 can be used as a first magnetic element 550 for providing the selective coupling.

Figure 7:
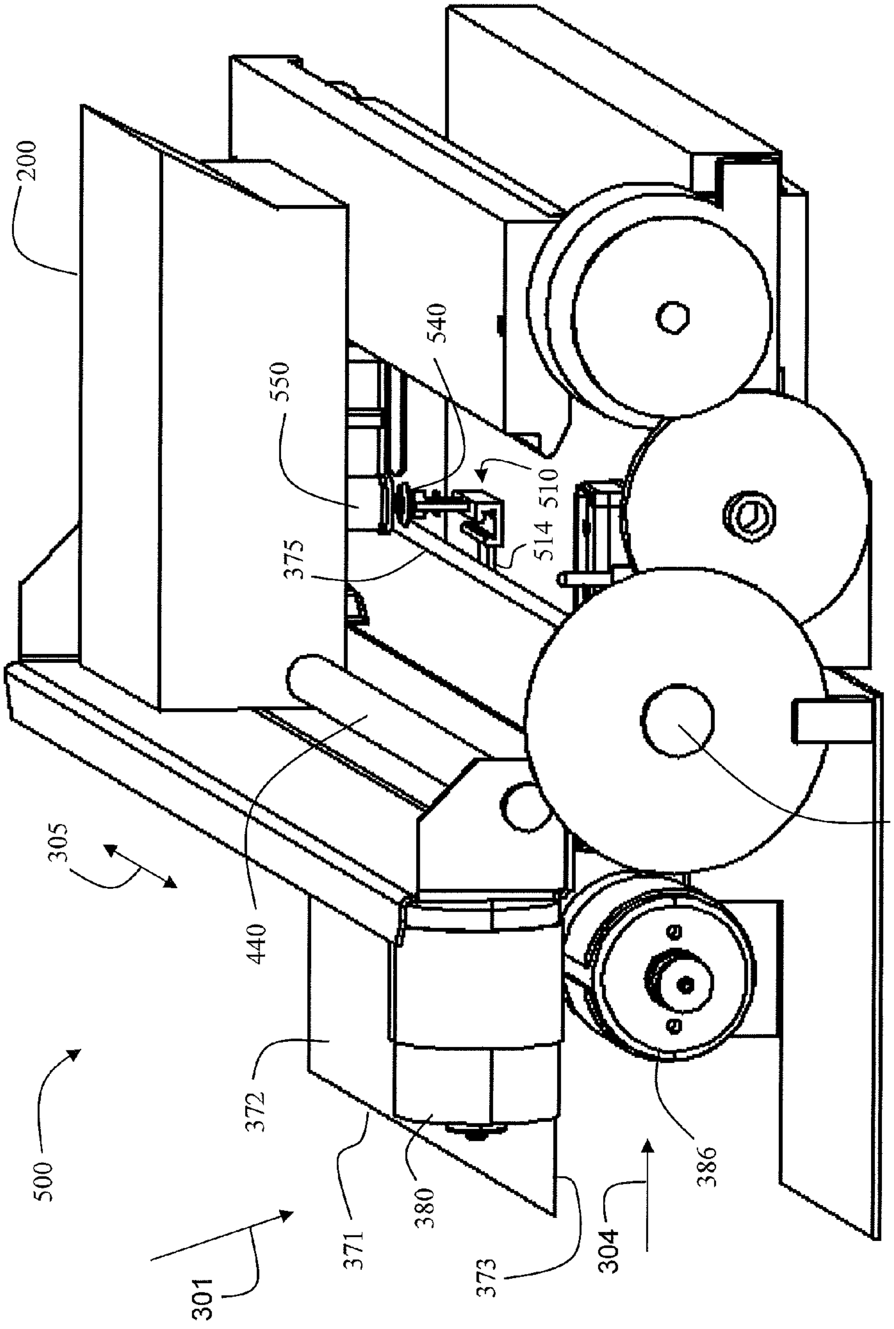
FIG. 7 is a perspective rotated slightly with respect to FIG. 6, and with the base and pinch roller assembly hidden.
Figure 8:
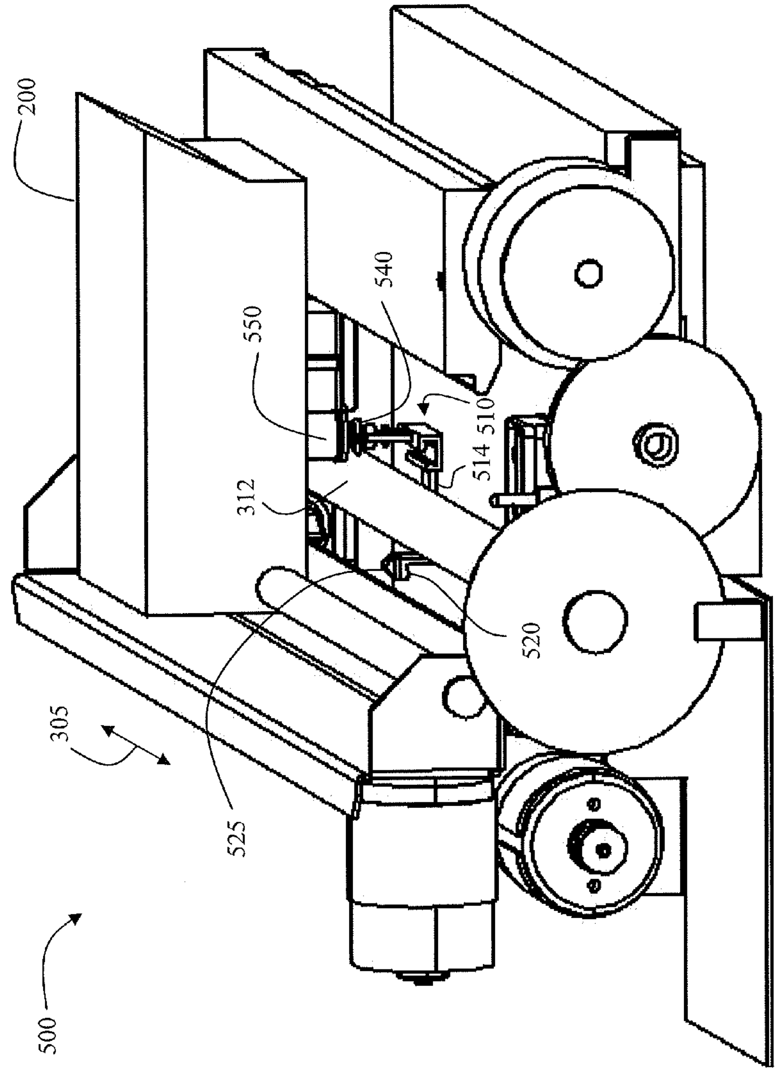
FIG. 8 shows a perspective similar to that of FIG. 7, but with a sheet of recording medium hidden.
Figure 9:
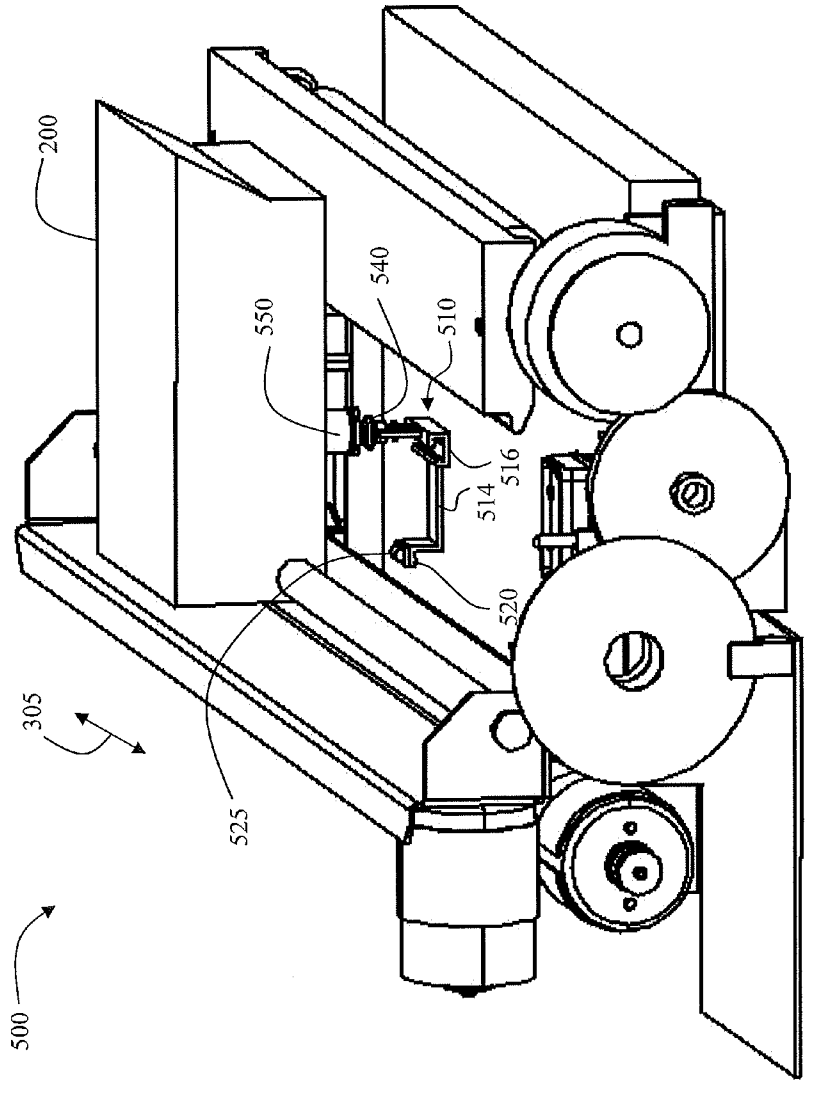
FIG. 9 is similar to FIG. 8 but with the feed roller also hidden.
Figure 10:
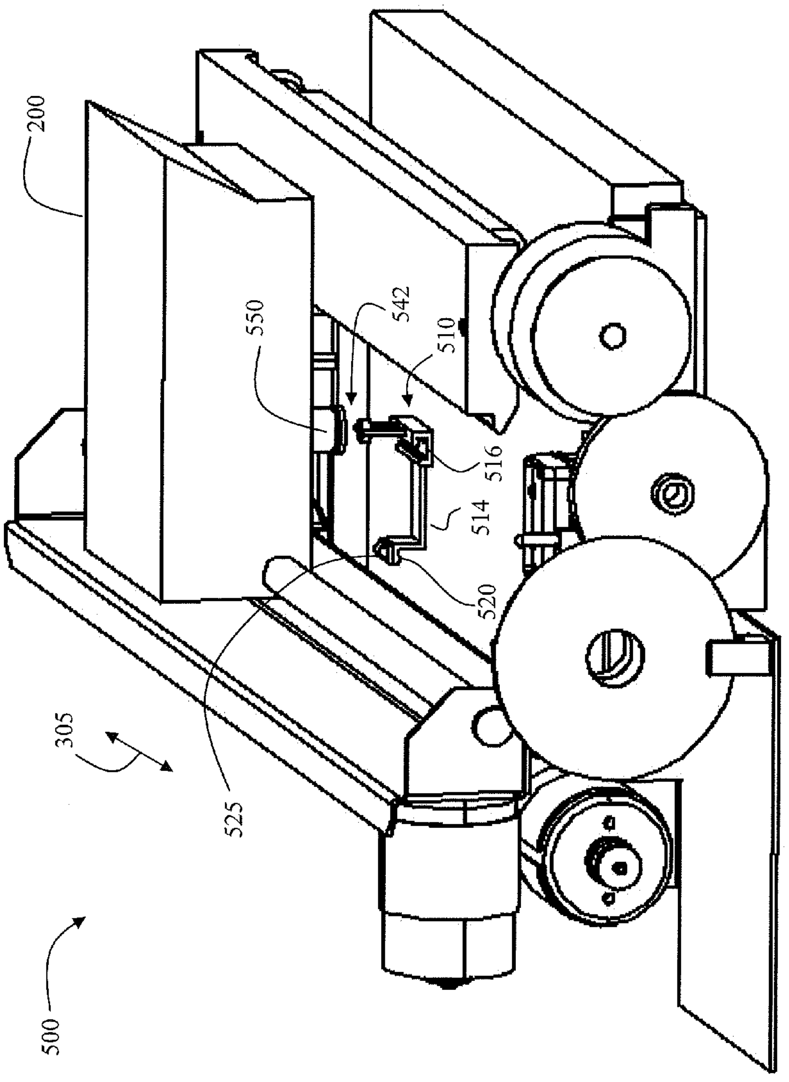
FIG. 10 is similar to FIG. 9 but with a magnetic element hidden.

FIGS. 7-10 show the printer embodiment of FIG. 6 with various features hidden in order to show other features more clearly. FIG. 7 is a perspective rotated slightly with respect to FIG. 6, and with the base 505 and a pinch roller assembly 327 hidden. The sheet 371 is shown advancing along the media advance direction 304. A lead edge 375 of the sheet 371 is positioned over the feed roller 312. A media advance motor 386 provides power to the various media advance rollers including the feed roller 312 and the discharge roller 324 (FIG. 6). A platform 510 includes a second magnetic element 540 for selective coupling to a first magnetic element 550 when the electromagnet is turned on, so that the motion of the platform 510 can be temporarily coupled to the motion of the carriage 200 along the carriage scan direction 305. The platform 510 includes an arm 514 that extends along a substantially horizontal direction to pass below the feed roller 312. FIG. 8 shows a perspective similar to that of FIG. 7, but with the sheet 371 hidden so that the mount 520 and the optical sensor 525 can be seen. The mount 520 and the optical sensor 525 are disposed at the other end of arm 514 so that a region of the nonprinting side 373 of the sheet 371 can be viewed by the optical sensor 525 upstream of the feed roller 312. In FIG. 9, the feed roller 312 is also hidden so that the full extent of the platform 510 can be seen. The platform 510 includes a track 512 that is oriented along the carriage scan direction 305. Not shown in FIGS. 7-10 is a rail oriented along the carriage scan direction 305 that the track 512 glides along when the carriage 200 is moving while coupled to the platform 510. In FIG. 10, the second magnetic element 540 is hidden in order to illustrate a gap 542 below the first magnetic element 550 when the electromagnet is turned off and the second magnetic element 540 (see FIG. 9) slides down and away from the first magnetic element 550 due to gravity or to the bias of a spring, for example. The sheet 371 is able to pass through this gap 542 for subsequent printing after the platform 510 is decoupled from the carriage 200, after optical sensor 525 has been moved along the carriage scan direction 305 to read the manufacturer's markings on the non printing side 372 of the sheet 371.

Figure 11:
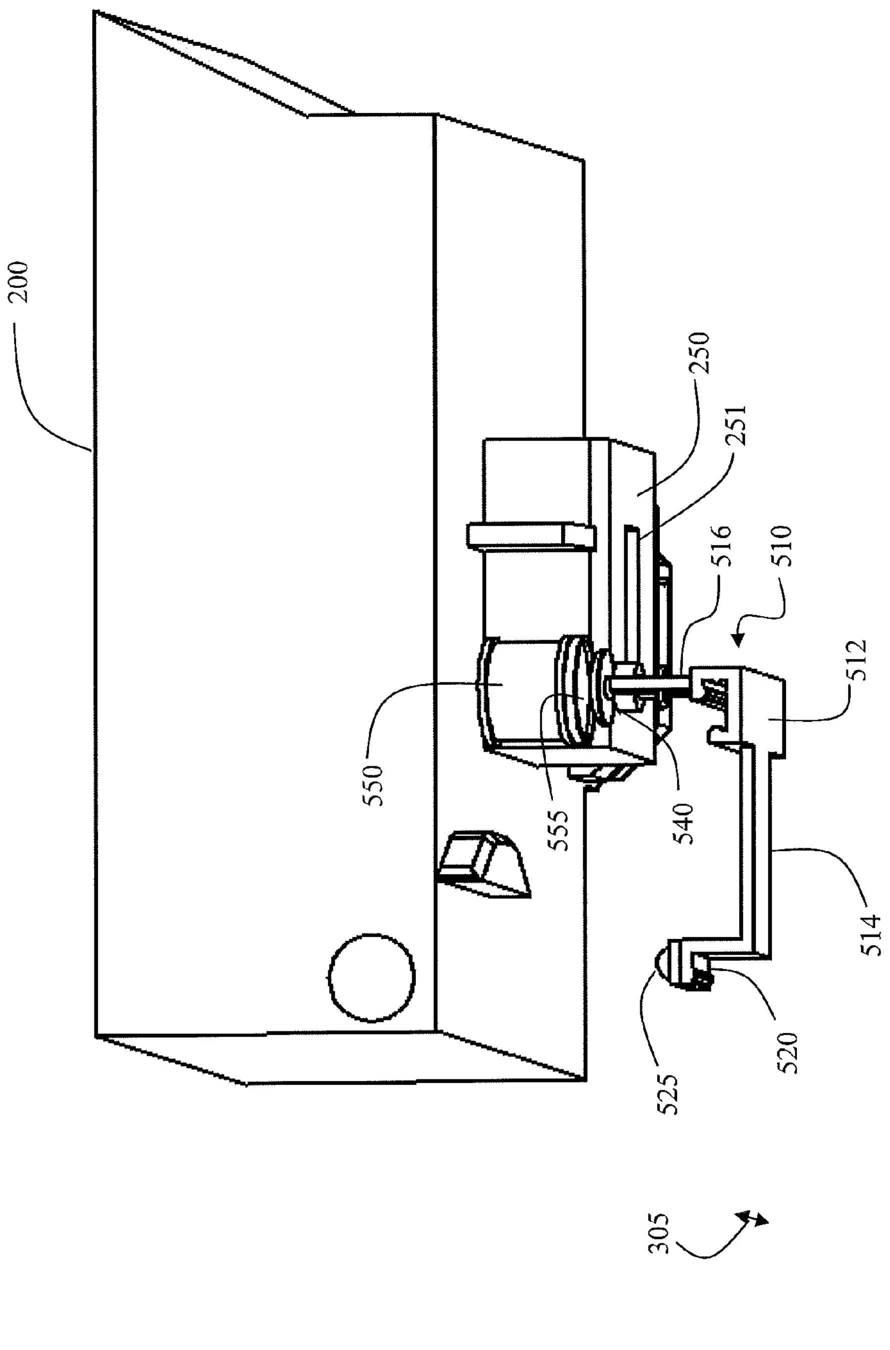
FIG. 11 shows an enlarged view of the under side of a carriage and a platform having an optical sensor.

FIG. 11 shows an enlarged view of the underside of the carriage 200 (i.e. near the printhead die 251 of the printhead 250) and the platform 510 without the other parts of printer 500. In this enlarged view the relationship of various components of the platform 510 and the carriage 200 can be seen more clearly. The platform 510 includes an arm 514 that extends from track 512 along a substantially horizontal direction. Mount 520 extends from the end of arm 514 that is opposite the track 512. The optical sensor 525 is disposed on the mount 520. Extending in a substantially vertical direction from the track 512 (i.e. perpendicular to or substantially perpendicular to the direction along which arm 514 extends) is a guide member 516. The second magnetic element 540 is slidably mounted on the guide member 516 so that it can slide upward toward first magnetic element 550 when the electromagnet is turned on. In the example describe above, the first magnetic element 550 includes an electromagnet and the second magnetic element 540 includes a magnetic material, such as a ferromagnetic material that can be attracted to the electromagnet when it is turned on. In other embodiments, the first magnetic element 550 can include a magnetic material and the second magnetic element 540 can include an electromagnet.

Figure 12:
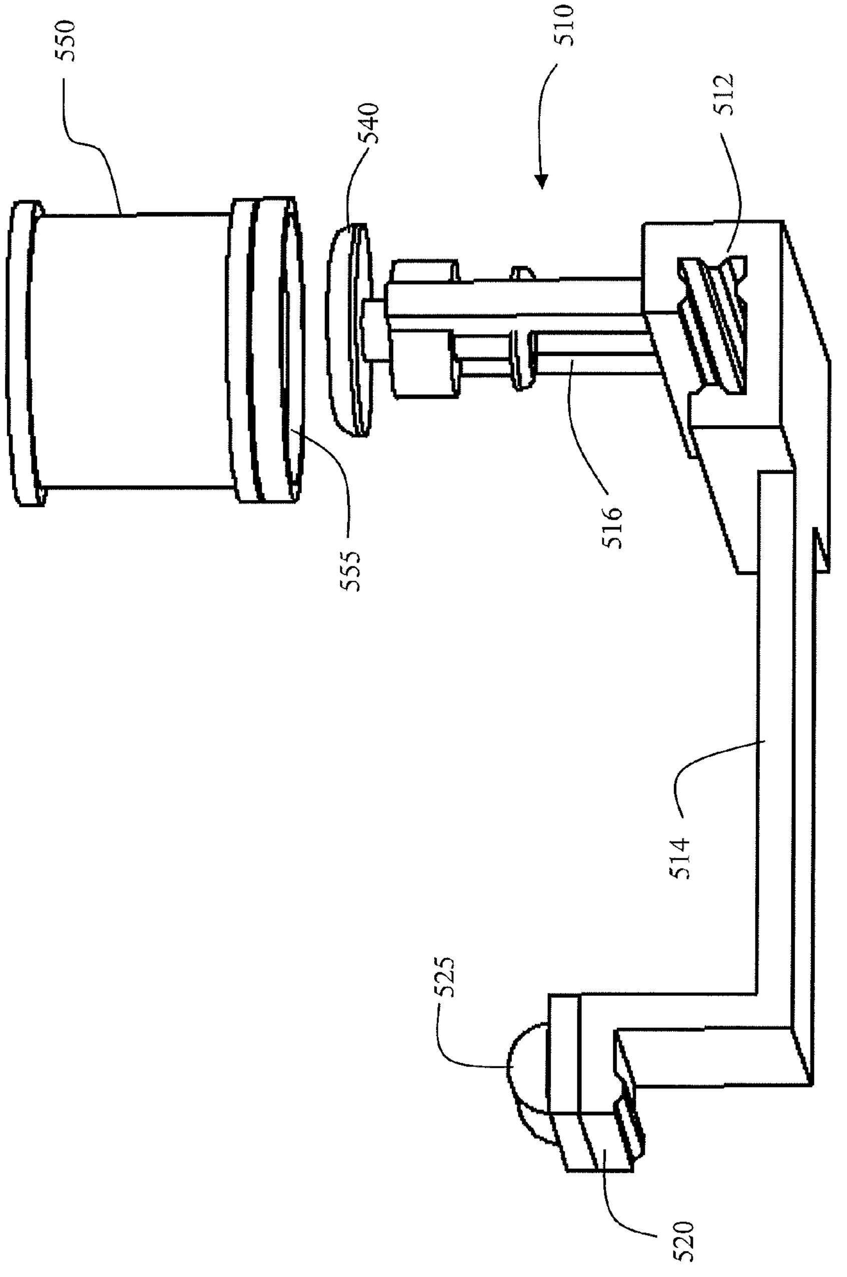
FIG. 12 shows an enlarged perspective of the platform without the carriage.

FIG. 12 shows a further enlarged perspective of the platform 510 and the first magnetic element 550 without the carriage 200. From this underside perspective it can be seen that the first magnetic element 550 (i.e. the electromagnet) includes a recess 555 that is shaped to receive a portion of the second magnetic element 540 when the electromagnet is turned on. In that way, a mechanical coupling in addition to the magnetic coupling is established between the platform 510 so that the platform 510 is more reliably coupled to the carriage 200 when the electromagnet is turned on and as the carriage 200 and the platform 510 move together along the carriage scan direction 305 (see also FIG. 11).

Figure 13:
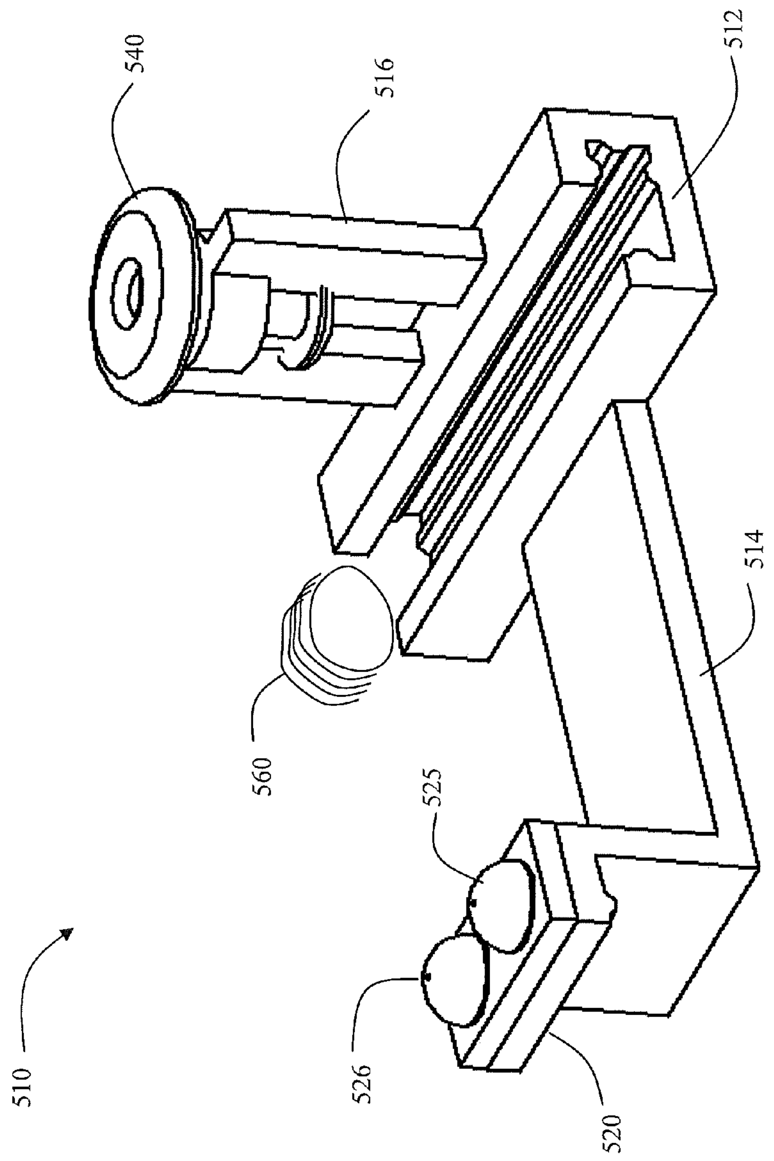
FIG. 13 is a perspective that is rotated with respect to FIG. 12.

FIG. 13 is a perspective of the platform 510 that is rotated with respect to FIG. 12 and that does not include the carriage 200. In this perspective it can be seen that a light source 526 is positioned next to the optical sensor 525 on the mount 520. The light source 526 is typically a light emitting diode that emits light toward the nonprinting side 373 of sheet 371 (FIG. 7) so that reflected light can be received by the optical sensor 525 as the platform 510 is moved by the carriage 200 along the carriage scan direction 305 to detect signals corresponding to manufacturer's markings indicating media type. "Light source" does not exclude wavelengths outside the visible range. An optional spring 560 is also shown in FIG. 13 for biasing the platform 510 toward a predetermined location, such as a home position, after the electromagnet is turned off and the platform 510 is decoupled from the carriage 200.

The light source 526 and the optical sensor 525 are typically connected to the electronics board 390 (FIG. 3) via one or more flex cables that are connected using cable connectors such as cable connectors 392 (FIG. 6) in order to permit movement of the platform 510. A flex cable is also typically used to connect the electromagnet to the electronics board 390. In embodiments where the electromagnet is the first magnetic element 550, this flex cable is routed to the carriage 200. In embodiments where the electromagnet is the second magnetic element 540, this flex cable is instead routed to the platform 510.

Figure 14:
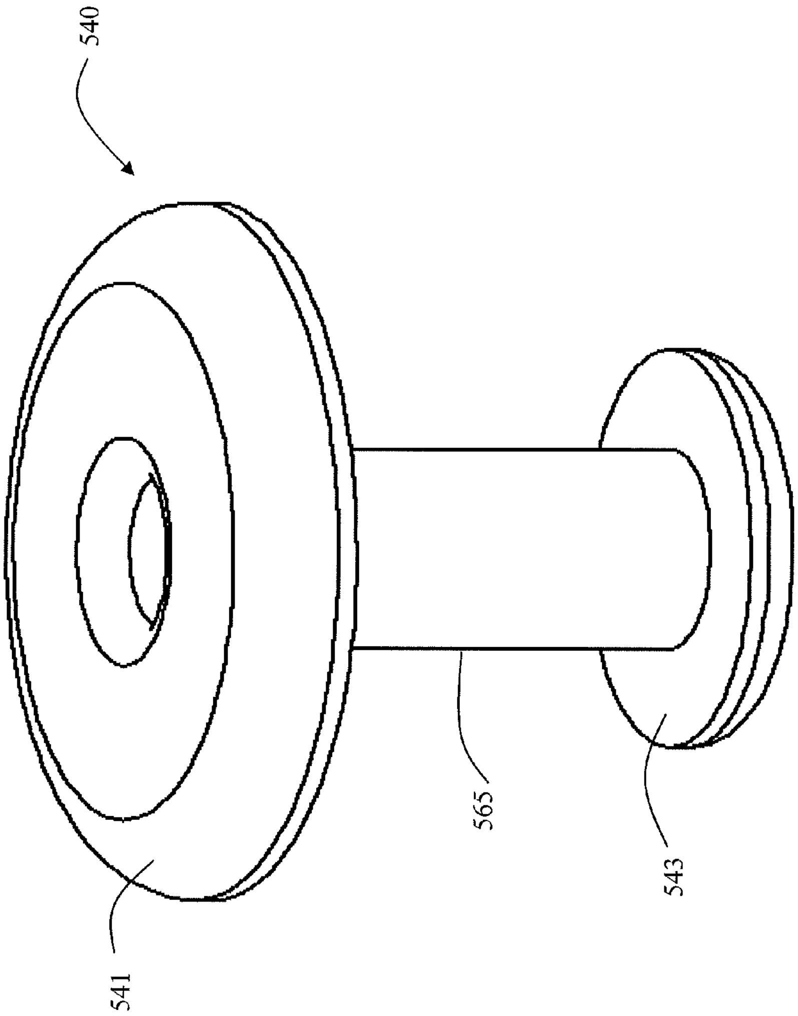
FIG. 14 is an enlarged perspective of a magnetic element.

FIG. 14 shows a close-up perspective of the second magnetic element 540. The second magnetic element 540 includes a coupling portion 541 that is nearest to the first magnetic element 550 and is configured to fit into the recess 555 (FIG. 12). A shaft 565 facilitates the vertical sliding motion when the electromagnet is turned on or off. A stop 543 limits the vertical sliding range of the second magnetic element 540.

Figure 15:
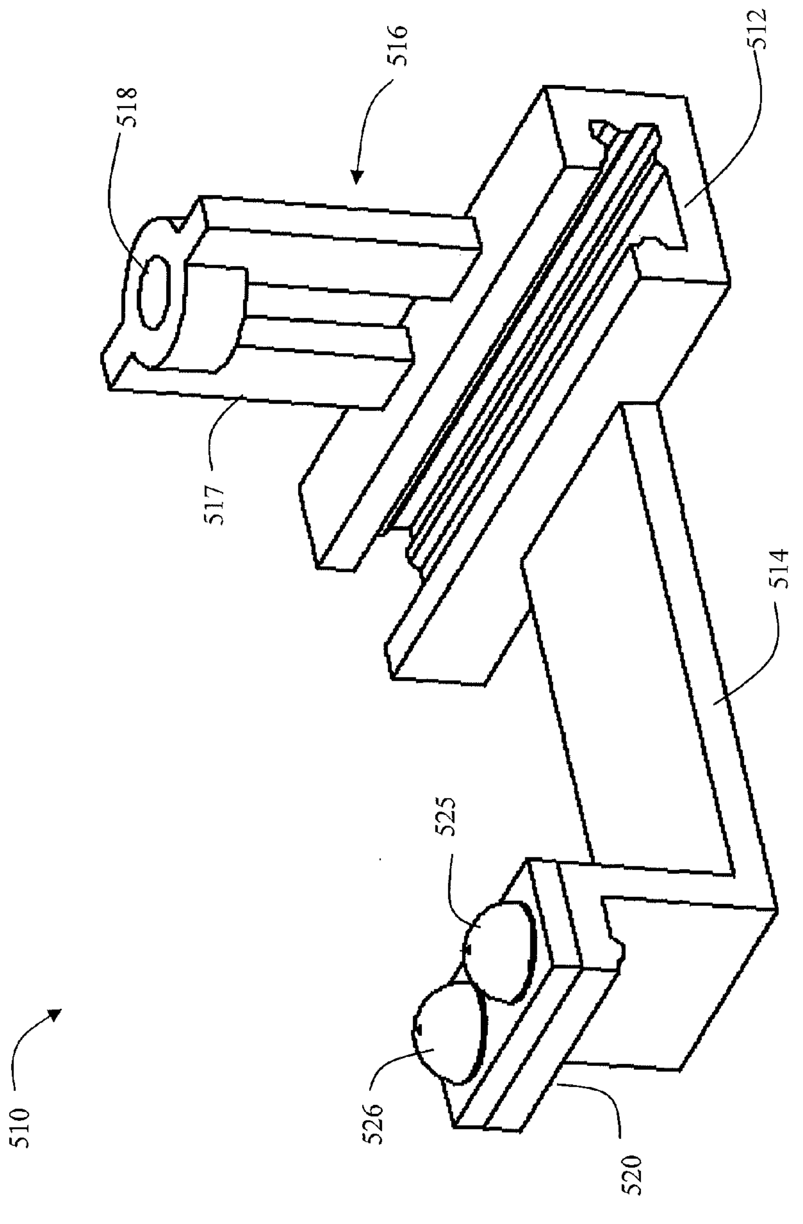
FIG. 15 is a perspective of the platform without the magnetic element.

FIG. 15 shows a close-up perspective of the platform 510 without the second magnetic element 550. In this example, the guide member 516 includes a pair of legs 517 that hold a collar 518. Collar 518 is configured to guide the shaft 565 (FIG. 14) of the second magnetic element 540 as it slides up and down.

Figure 16:
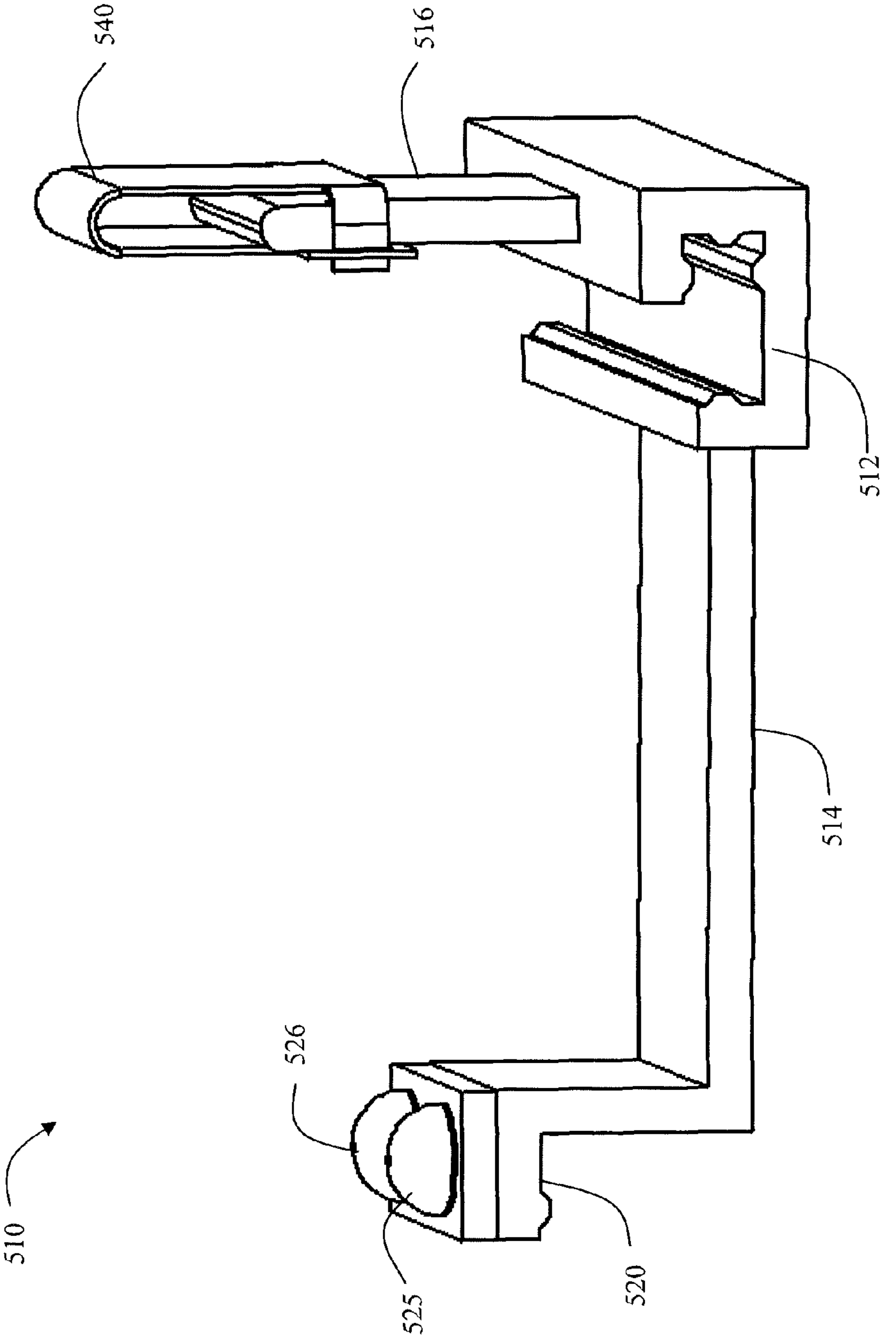
FIG. 16 shows another embodiment of the platform.

FIG. 16 shows another embodiment of platform 510. The configuration is similar to that shown in FIG. 13, except for the second magnetic element 540 and the shape of the guide member 516. The guide member 516 has a blade shape in this example. The second magnetic element 540 is a sheet of magnetic material that is loosely folded to fit around the guide member 516. In this example, the corresponding recess 555 (FIG. 12) in the first magnetic element 550 would be elongated rather than round so that it is configured to receive and mechanically couple to the second magnetic element 540 when the electromagnet is turned on.

Having described the elements of embodiments of the inkjet printer, a context has been provided relative to FIGS. 4-16 for describing a method of printing. The sheet 371 of recording medium is advanced from the media input support 321 to a region (for example near the feed roller 312) that is upstream of the print region 303. The platform 510, including the optical sensor 525, is coupled to the carriage 200, for example by turning on an electromagnet to couple to a magnetic material. The carriage motor 380 is operated to move the carriage 200 along the carriage scan direction 305, thereby also moving the platform 510 that is coupled to the carriage 200. Light is received from the sheet 371 in the optical sensor 525. The optical sensor 525 converts the received light into a plurality of sequential electrical signals whose magnitude depends on the intensity of light received. The plurality of electrical signals are sent by the optical sensor 525 for signal processing in order to determine a media type of the sheet 371 of recording medium. Signal processing typically includes processing the plurality of electrical signals into digital data as a function of position of the carriage 200 along the carriage scan direction 305 using the linear encoder 383. A first peak and a second peak are identified in the digital data corresponding to bars that are marked by the manufacturer on the nonprinting side 373 of the sheet 371. A distance is computed between the first peak and the second peak. Media type is determined by comparing the digital data to data stored in the memory 21 corresponding to different media types. The platform 510 is then decoupled from the carriage 200, for example by turning off the electromagnet. The controller 14 then selects a print mode for printing an image, and the image processing unit 15 processes the image according to that print mode. The sheet 371 is further advanced into print region 303 and the selected print mode is used to print the image on sheet 371.

When the electromagnet (e.g. the first magnetic element 550) is turned on, the second magnetic element 540 on the platform 510 is caused to move toward the electromagnet due to the magnetic field. In some embodiments, the electromagnet includes a recess for receiving the second magnetic element 540 for mechanical engagement with the electromagnet.

Typically the light source 526, such as an LED, is also mounted on the platform 510. The light source 526 emits light toward the sheet 371, such that the light received in the optical sensor 525 corresponds to emitted light that has been reflected from the recording medium. In particular, the light is emitted toward the nonprinting side 373 of the recording medium, and the image is subsequently printed on the printing side 372 that is opposite the nonprinting side.

Typically advance of the sheet 371 is stopped before moving the platform 510 that is coupled to the carriage 200. In order to accurately measure distances between manufacturer's markings (see FIG. 5), it is important that the relative motion only be along the carriage scan direction 305, and not also along the media advance direction 304 while the optical sensor 525 is receiving the reflected light. After the optical sensor 525 has been moved along the carriage scan direction 305 to receive light corresponding to the manufacturer's markings, the electromagnet is turned off to decouple the platform 510 from the carriage 200. As a result, the second magnetic member 540 slides down the guide member 516 of the platform 510, thereby providing a gap 542 for passage of the sheet 371 toward the print region 303. After decoupling the platform 510 from the carriage 200, the sheet 371 is advanced by the feed roller 312 into the print region 303 so the image can be printed by the printhead 250.

The platform 510 is typically located at a predetermined location, such as a home position, when it is decoupled from the carriage 200 so that timing of the turning on of the electromagnet can be reliably controlled for coupling when the first magnetic element 550 is located near the second magnetic element 540. In some embodiments, before decoupling the platform 510 from the carriage 200, the platform 510 is first moved back to the predetermined location. In other embodiments, the optional spring 560 is used to move the platform 510 to the predetermined location by a spring force after decoupling the platform 510 from the carriage 200.

The invention has been described in detail with particular reference to certain preferred embodiments thereof, but it will be understood that variations and modifications can be effected within the spirit and scope of the invention.

PARTS LIST

10 Inkjet printer system
12 Image data source
14 Controller
15 Image processing unit
16 Electrical pulse source
18 First fluid source
19 Second fluid source
20 Recording medium
21 Memory
100 Inkjet printhead
110 Inkjet printhead die
111 Printhead die substrate
120 First nozzle array
121 Nozzle(s)
122 Ink delivery pathway (for first nozzle array)
130 Second nozzle array
131 Nozzle(s)
132 Ink delivery pathway (for second nozzle array)
181 Droplet(s) (ejected from first nozzle array)
182 Droplet(s) (ejected from second nozzle array)
200 Carriage
221 First type recording medium
222 Second type recording medium
225 First bar of anchor bar pair
226 Second bar of anchor bar pair
228 Identification mark for first type recording medium
229 Identification mark for second type recording medium
240 Ovals
250 Printhead
251 Printhead die
253 Nozzle array
254 Nozzle array direction
255 Mounting support member
256 Encapsulant
257 Flex circuit
258 Connector board
262 Multi-chamber ink supply
264 Single-chamber ink supply
300 Printer chassis
301 Paper load entry direction (for L path)
302 Paper load entry direction (for C path)
303 Print region
304 Media advance direction
305 Carriage scan direction
306 Right side of printer chassis
307 Left side of printer chassis
308 Front of printer chassis
309 Rear of printer chassis
310 Hole (for paper advance motor drive gear)
311 Feed roller gear
312 Feed roller
313 Forward rotation direction (of feed roller)
320 Pick-up roller
321 Media input support
323 Pinch roller
324 Discharge roller
325 Star wheel(s)
326 Star wheel assembly
327 Pinch roller assembly
330 Maintenance station
370 Stack of media
371 Sheet
372 Printing side
373 Nonprinting side
375 Lead edge
380 Carriage motor
381 Encoder sensor
382 Carriage guide rail
383 Linear encoder
384 Belt
386 Media advance motor
390 Printer electronics board
392 Cable connectors
400 Absorbent material
405 Support pins
420 Platen
425 Opening (in platen)
430 Ink drops
440 Carriage guide rod
500 Printer chassis
505 Base
510 Platform
512 Track
514 Arm
516 Guide member
517 Pair of legs
518 Collar
520 Mount
525 Optical sensor
526 Light source
540 Second magnetic element
541 Coupling portion
542 Gap
543 Stop
550 First magnetic element
555 Recess

560 Spring

565 Shaft

The invention claimed is:

1. An inkjet printer having a paper path that includes a print region, the inkjet printer comprising:

an inkjet printhead;

a media advance system for advancing a recording medium along the paper path and through the printing region;

a carriage for moving the printhead back and forth in a carriage scan direction across the print region, wherein the inkjet printhead faces a printing side of the recording medium; the carriage including a first magnetic element; and a platform that is movable along the carriage scan direction, the platform including:

an optical sensor for receiving light from the recording medium to determine a type of recording medium; wherein the optical sensor faces a nonprinting side of the recording medium; and a second magnetic element for selectively and magnetically coupling to the first magnetic element, wherein, when the first and second magnetic elements are in a coupled mode, the optical sensor can be moved along the carriage scan direction as it receives light from the recording medium for sensing an identification mark to determine the type of recording medium, and wherein, when the first and second magnetic elements are in a decoupled mode, printing is permitted on the recording medium.

2. The inkjet printer of claim 1 further comprising a controller for analyzing signals from the optical sensor for determining the type of recording medium.

3. The inkjet printer of claim 1, wherein the platform further includes a light source for emitting light toward the recording medium for sensing by the optical sensor.

4. The inkjet printer of claim 1, wherein the media advance system includes a feed roller for advancing recording medium toward the print region.

5. The inkjet printer of claim 4, wherein the platform further includes a track that is oriented along the carriage scan direction.

6. The inkjet printer of claim 5, wherein the platform further includes an arm that extends from the track in a first direction for passing below the feed roller.

7. The inkjet printer of claim 6, wherein the platform further includes a mount extending from an end of the arm that is opposite the track, wherein the optical sensor is disposed on the mount.

8. The inkjet printer of claim 7, wherein the platform further includes a guide member disposed along a second direction that is perpendicular to or substantially perpendicular to the first direction.

9. The inkjet printer of claim 8, wherein the second magnetic element is slidably mounted on the guide member.

10. The inkjet printer of claim 8, wherein the first direction is a horizontal direction and the second direction is a vertical direction.

11. The inkjet printer of claim 1, wherein the first magnetic element comprises an electromagnet.

12. The inkjet printer of claim 11, wherein the second magnetic element comprises a magnetic material.

13. The inkjet printer of claim 12, wherein the electromagnet includes a recess that is configured to receive a portion of the second magnetic element.

14. The inkjet printer of claim 1 further comprising a linear encoder disposed along the carriage scan direction for monitoring a position of the carriage.

15. The inkjet printer of claim 1, wherein the optical sensor is oriented to receive light from a nonprinting side of the recording medium.

16. The inkjet printer of claim 3, wherein the light source is a light emitting diode.

17. The inkjet printer of claim 1 further comprising a spring for biasing the platform toward a predetermined location.

* * * * *